United States Patent
Moganti et al.

(10) Patent No.: US 9,621,407 B2
(45) Date of Patent: Apr. 11, 2017

(54) APPARATUS AND METHOD FOR PATTERN HIDING AND TRAFFIC HOPPING

(71) Applicants: Madhav Moganti, Edison, NJ (US); Mayuresh Pandit, Chatham, NJ (US); Anish Sankalia, Lawrenceville, GA (US)

(72) Inventors: Madhav Moganti, Edison, NJ (US); Mayuresh Pandit, Chatham, NJ (US); Anish Sankalia, Lawrenceville, GA (US)

(73) Assignee: Alcatel Lucent, Boulogne-Billancourt (FR)

(*) Notice: Subject to any disclaimer, the term of this patent is extended or adjusted under 35 U.S.C. 154(b) by 432 days.

(21) Appl. No.: 13/731,597

(22) Filed: Dec. 31, 2012

(65) Prior Publication Data
US 2013/0254364 A1 Sep. 26, 2013

Related U.S. Application Data

(60) Provisional application No. 61/614,345, filed on Mar. 22, 2012.

(51) Int. Cl.
*H04L 12/24* (2006.01)
*H04L 29/06* (2006.01)

(52) U.S. Cl.
CPC ............ *H04L 41/00* (2013.01); *H04L 63/08* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 5,961,593 A * | 10/1999 | Gabber et al. | 709/219 |
| 6,061,789 A | 5/2000 | Hauser et al. | |
| 6,604,143 B1 * | 8/2003 | Nagar et al. | 709/229 |
| 6,873,620 B1 * | 3/2005 | Coveley et al. | 370/395.31 |
| 8,468,348 B1 | 6/2013 | Wasserman et al. | |
| 2002/0038431 A1 * | 3/2002 | Chesko et al. | 713/200 |
| 2003/0080997 A1 * | 5/2003 | Fuehren et al. | 345/744 |
| 2003/0084165 A1 * | 5/2003 | Kjellberg et al. | 709/227 |
| 2003/0131260 A1 * | 7/2003 | Hanson et al. | 713/201 |
| 2003/0229717 A1 | 12/2003 | Teague | |
| 2004/0139204 A1 * | 7/2004 | Ergezinger et al. | 709/229 |

(Continued)

*Primary Examiner* — Scott B Christensen
*Assistant Examiner* — Sean Concannon
(74) *Attorney, Agent, or Firm* — Tong, Rea, Bentley & Kim, LLC

(57) ABSTRACT

A secure communication mechanism is disclosed. The secure communication mechanism may utilize one or more secure communication capabilities to secure communications of various types of users in various types of networks. The secure communication capabilities may include one or more of a user pattern hiding capability (e.g., a user behavior pattern hiding capability, a user communication pattern hiding capability, a user browsing pattern hiding capability, or the like), a gateway hopping capability, or the like, as well as various combinations thereof. The users may include corporate users (e.g., for communications related to corporate matters or for communications related to personal matters), user associated with non-corporate entities, individuals not associated with a corporation or other type of entity (e.g., individual users, groups of users, or the like), or the like.

22 Claims, 10 Drawing Sheets

(56) References Cited

U.S. PATENT DOCUMENTS

| | | |
|---|---|---|
| 2005/0182968 A1 | 8/2005 | Izatt et al. |
| 2006/0182103 A1 | 8/2006 | Martini |
| 2006/0227959 A1 | 10/2006 | Mitchell |
| 2006/0265483 A1* | 11/2006 | Wang et al. .................. 709/223 |
| 2007/0011245 A1* | 1/2007 | Kawashima et al. ......... 709/206 |
| 2007/0106612 A1 | 5/2007 | O'Brien et al. |
| 2007/0130343 A1* | 6/2007 | Pardo-Blazquez et al. .. 709/227 |
| 2008/0115223 A1 | 5/2008 | Morris et al. |
| 2008/0208611 A1 | 8/2008 | Krooss |
| 2009/0024636 A1 | 1/2009 | Shiloh |
| 2009/0131080 A1* | 5/2009 | Nadler ................... G06Q 30/02 455/456.3 |
| 2009/0150488 A1 | 6/2009 | Martin-Cocher et al. |
| 2009/0210714 A1 | 8/2009 | Haider et al. |
| 2009/0217351 A1* | 8/2009 | Burch et al. ...................... 726/3 |
| 2009/0254971 A1* | 10/2009 | Herz ...................... G06Q 10/10 726/1 |
| 2010/0095337 A1 | 4/2010 | Dua |
| 2010/0153285 A1 | 6/2010 | Anderson et al. |
| 2010/0217825 A1* | 8/2010 | Gopalakrishna ........ H04L 67/02 709/217 |
| 2010/0287286 A1 | 11/2010 | Bustamente |
| 2010/0299603 A1 | 11/2010 | Farkas |
| 2011/0019661 A1 | 1/2011 | Ku |
| 2011/0216762 A1 | 9/2011 | Nas |
| 2011/0302244 A1 | 12/2011 | McCann et al. |
| 2012/0101911 A1 | 4/2012 | Shiloh |
| 2012/0191862 A1* | 7/2012 | Kovvali .............. H04L 29/0881 709/227 |
| 2012/0195235 A1 | 8/2012 | Balla et al. |
| 2012/0254326 A1 | 10/2012 | Bellan et al. |
| 2012/0317205 A1 | 12/2012 | Lahiani et al. |
| 2012/0330993 A1 | 12/2012 | Faiman et al. |
| 2013/0061333 A1* | 3/2013 | Davis .................. H04L 63/0861 726/28 |
| 2013/0129066 A1 | 5/2013 | Yeung et al. |
| 2014/0253674 A1 | 9/2014 | Grondal et al. |

* cited by examiner

APPARATUS AND METHOD FOR PATTERN HIDING AND TRAFFIC HOPPING

CROSS-REFERENCE TO RELATED APPLICATION

This application claims the benefit of U.S. Provisional Patent Application Ser. No. 61/614,345, entitled "NEW SECURE COMMUNICATION MECHANISMS AND CAPABILITIES," filed Mar. 22, 2012, which is hereby incorporated herein by reference in its entirety.

TECHNICAL FIELD

This case relates generally to communications and, more specifically but not exclusively, to security of communications.

BACKGROUND

In many cases, the line between corporate communications and personal communications is becoming blurred. The introduction of certain practices, such as bring your own device (BYOD) or bring your own PC (BYOPC), is putting corporate information at risk. Similarly, technologies such as "big data mining" are putting corporate information at risk. Additionally, there also are instances of corporate information or intentions being shared by corporate users, knowingly or unknowingly, in a manner that enables such information or intentions to be passed on to or obtained by competitors or malicious entities (e.g., via social media websites, public forums, cloud platforms, and the like). While most corporations employ security mechanisms within their corporate networks, such mechanisms do not always adequately secure communications of the corporate users of the corporate networks, which may include both corporate communications and personal communications by the corporate users. Furthermore, many such security issues also exist for communications by users of non-corporate entities, personal communications by individuals, and so forth.

SUMMARY

Various deficiencies in the prior art are addressed by embodiments for supporting secure communications.

In one embodiment, an apparatus includes a processor and a memory communicatively connected to the processor. The processor is configured to maintain a virtual user space for a user. The virtual user space includes a virtual user identity associated with the user and a virtual user device associated with a user device of the user. The virtual user identity includes virtual user information for the user that is at least partially different than real user information associated with the user. The virtual user device includes virtual user device information for the user device that is at least partially different than real user device information associated with the user device. The processor is configured to receive an indication of a communication action initiated at the user device of the user. The processor is configured to process the communication action for the user based on at least one of the virtual user identity associated with the user or the virtual user device associated with the user device of the user.

In one embodiment, an apparatus includes a processor and a memory communicatively connected to the processor. The processor is configured to detect a communication action initiated for a user of a user device. The processor is configured to select a virtual user space from a plurality of available virtual user spaces associated with the user. The virtual user space includes a virtual user identity associated with the user and a virtual user device associated with a user device of the user. The virtual user identity includes virtual user information for the user that is at least partially different than real user information associated with the user. The virtual user device includes virtual user device information for the user device that is at least partially different than real user device information associated with the user device. The processor is configured to propagate an indication of the communication action toward a virtual user server hosting the virtual user space.

In one embodiment, an apparatus includes a processor and a memory communicatively connected to the processor. The processor is configured to determine a pattern hiding function to be performed by a pattern hiding agent of a first device for hiding a pattern associated with content of a communication from the first device to a second device and determine a pattern reassembling function to be performed by a pattern reassembling agent of the second device for reassembling the content of the communication from the first device to the second device.

In one embodiment, an apparatus includes a processor and a memory communicatively connected to the processor. The processor is configured to receive a real web browsing request initiated for a user where the real web browsing request includes a real search term, generate a fake web browsing request for the user where the fake web browsing request includes a fake search term, and propagate the real web browsing request and the fake web browsing request toward at least one web server.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

In general, secure communication capabilities are presented herein, although various other capabilities also may be presented herein. The secure communication capabilities may include one or more of a user pattern hiding capability (e.g., a user behavior pattern hiding capability, a user communication pattern hiding capability, a user browsing pattern hiding capability, or the like), a gateway hopping capability, or the like, as well as various combinations thereof. It will be appreciated that various combinations of such secure communication capabilities may be used together. It will be appreciated that such embodiments may be used for any user or users which may utilize communication networks, such as corporate users (e.g., for communications related to corporate matters or for communications related to personal matters), users associated with non-corporate entities (e.g., users at universities, non-profit organizations, or the like), individual users not operating on behalf of or associated with an entity (e.g., individual users, groups of users, or the like), or the like.

In at least some embodiments, a user behavior pattern hiding capability is provided. The user behavior pattern hiding capability enables a user to hide one or more details related to the behavior of the user in using communication networks for communications (e.g., for voice-based communications, for web-based communications, or the like, as well as various combinations thereof). For example, the user may be able to hide details such as the identity of the user (or a user identity used by the user), the device used by the user to communicate, the location from which the user communicates, the communication network used by the user to communicate, or the like, as well as various combinations thereof. In at least some embodiments, a user behavior pattern hiding capability is provided for a user using one or more virtual user spaces supported for the user. An exemplary embodiment is depicted and described in FIG. 1.

Figure 1:
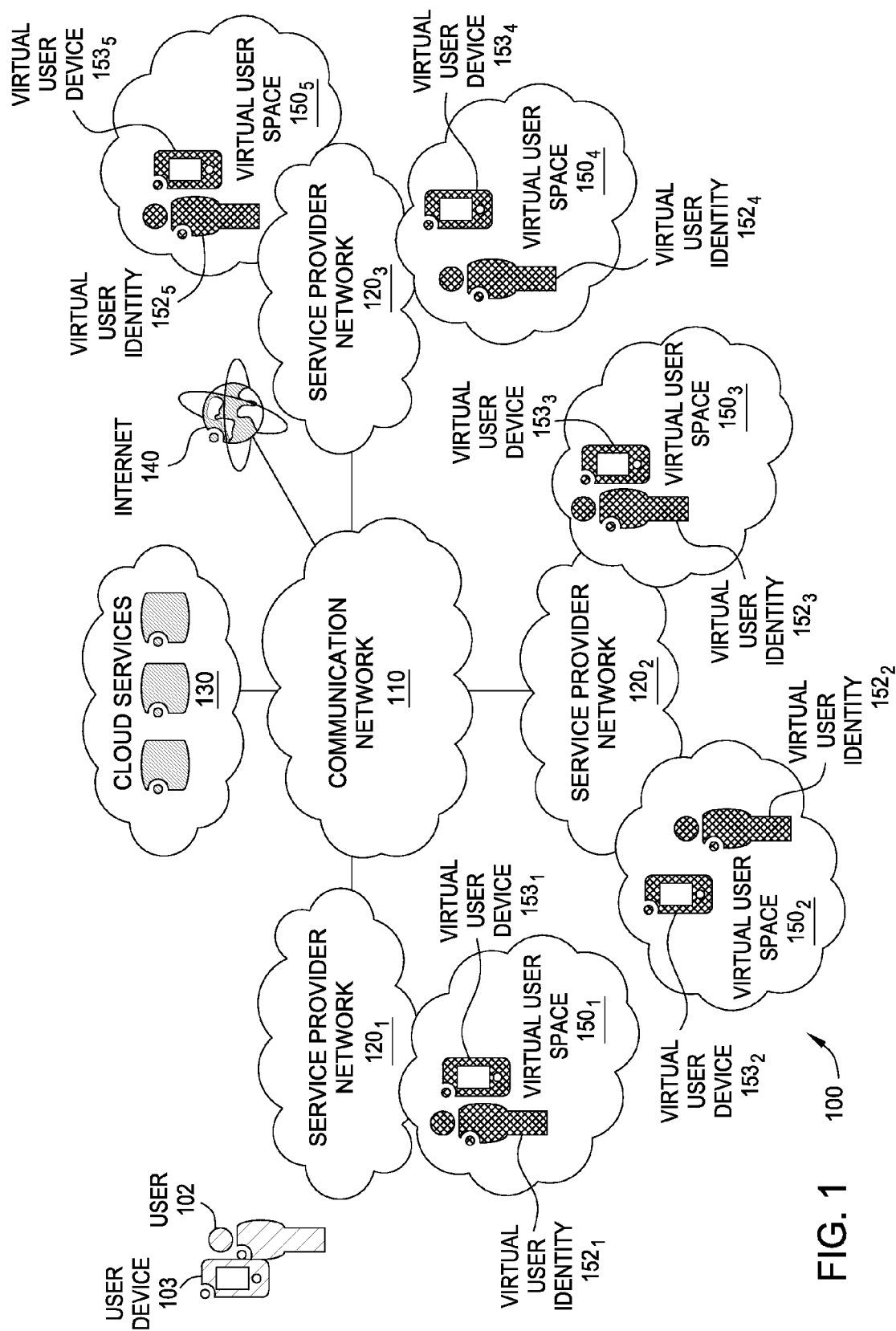
FIG. 1 depicts an exemplary communication system configured to support a user behavior pattern hiding capability using virtual user spaces.

FIG. 1 depicts an exemplary communication system configured to support a user behavior pattern hiding capability using virtual user spaces.

As depicted in FIG. 1, the communication system 100 includes a communication network 110, three service provider networks (SPNs) $120_1$-$120_3$ (collectively, SPNs 120), a set of cloud services 130, and the Internet 140. The SPNs 120, set of cloud services 130, and Internet 140 are each configured to communicate with and, thus, are accessible via, communication network 110. The SPNs 120 may include wireline communication networks, wireless communication networks, or the like. The SPNs 120 may be operated by the same service provider or by different service providers. The set of cloud services 130 may include any services which may be made available in the cloud (e.g., applications, file systems, or the like, as well as various combinations thereof). The Internet 140 represents a general type of connectivity to any other devices and services which may be accessed and communicated with via communication networks.

As further depicted in FIG. 1, a user 102 has an associated user device 103 which may access SPN $120_1$. For example, the user device 103 may be a desktop computer, a laptop computer, a tablet computer, a smart phone, a cell phone, a set top box, a gaming console, a television, or the like. The user 102 may request or perform actions via the user device 103, such as initiating a phone call (e.g., to another user device associated with one of the SPNs 120 or available via the Internet 140), initiating a web search, initiating a request for use of a cloud service from the set of cloud services 130, or the like. Thus, the actions may include actions in which services are requested, actions in which services or portions of services are performed, or the like, as well as various combinations thereof. The types of actions which may be requested or performed by a user via a user device and an associated communication network will be understood by one skilled in the art.

As further depicted in FIG. 1, a plurality of virtual user spaces $150_1$-$150_5$ (collectively, virtual user spaces 150) have been configured for the user 102. The virtual user space $150_1$ is configured using resources of SPN $120_1$, the virtual user spaces $150_2$ and $150_3$ are configured using resources of SPN $120_2$, and the virtual user spaces $150_4$ and $150_5$ are configured using resources of SPN $120_3$.

The virtual user spaces $150_1$-$150_5$ include respective sets of virtual user resources, which are omitted for purposes of clarity. The virtual user resources of the virtual user spaces 150 (and, thus, the virtual user spaces 150) are configured for use in hiding behavior patterns of the user 102. For example, the virtual user resources of the virtual user spaces 150 may be configured to perform various functions capable of being performed by user device 102, such that the virtual user resources of the virtual user spaces 150 may perform actions on behalf of user device 103 (and, thus, user 102) in a manner tending to hide various characteristics of user 102 or user device 103 (e.g., the identity of the user 102 (or a user identity used by the user 102), the user device 103 used by the user 102, the location from which the user 102 communicates, the communication network (e.g., SPN $120_1$) used by the user 102, or the like, as well as various combinations thereof). The virtual user resources may include computing resources, storage resources, bandwidth resources, information (e.g., virtual user information for user 102, virtual user device information for user device 103, and so forth), or the like, as well as various combinations thereof. The virtual user resources for the virtual user spaces 120 may be provided using resources of the SPNs 120 hosting the respective user spaces 120 (e.g., computing resources, storage resources, bandwidth resources, or the like, as well as various combinations thereof).

As depicted in FIG. 1, the virtual user spaces $150_1$-$150_5$ have respective virtual user identities $152_1$-$152_5$ (collectively, virtual user identities 152) and virtual user devices $153_1$-$153_5$ (collectively, virtual user identities 153) associated therewith. The virtual user identities 152 and the virtual user devices 153 of the virtual user spaces 150 may be supported using virtual user resources of the virtual user spaces 150.

The virtual user identities 152 represent one or more virtual identifies for the user 102. For example, where the user 102 may have real user information associated therewith (e.g., a real name, a real mailing address, one or more real network addresses, one or more real communication identifiers, one or more real ENUM names, and the like), each virtual user identity 152 may have corresponding virtual user information associated therewith (e.g., one or more of a fake name, a fake mailing address, one or more fake network addresses, one or more fake communication identifiers, one or more fake ENUM names, or the like). For example, where the user sends an email message, a virtual user identity 152 may be used to hide the real email address of the user 102. For example, where the user sends a text message, a virtual user identity 152 may be used to hide the real telephone number of the user 102. For example, where the user sends an instant message, a virtual user identity 152 may be used to hide the real instant message identifier of the user 102. For example, where the user 102 places an order online, a virtual user identity 152 may be used to hide the real name and real mailing address of the user 102. Thus, the virtual user identities 152 may provide various flavors of user identity that the user 102 may utilize to hide various aspects of his or her life which might otherwise be unsecure when the user 102 communicates via one or more of the SPNs 120, accesses services via one or more of the SPNs 120, or the like.

The virtual user devices 153 represent one or more virtual devices for "use" by the user 102. For example, where the user device 103 may have real device information associated therewith (e.g., a real user device identifier, a real user device type, a real user device manufacturer, a real user device model, or the like), each virtual user device 153 may have corresponding virtual user device information associated therewith (e.g., a virtual user device identifier, a virtual user device type, a virtual user device manufacturer, a virtual user device model, or the like). For example, where user device 103 of user 102 is a particular type of desktop computer (e.g., a particular brand), the virtual user device $153_1$ may be configured as a desktop computer of a different brand (e.g., to hide the brand of user device 103 that user 102 uses). For example, where user device 103 of user 102 is a laptop, the virtual user device $153_2$ may be configured as a tablet computer (e.g., to hide the type of user device 103 that user 102 uses). For example, where user device 103 of user 102 is a Fourth Generation (4G) smart phone, the virtual user device $153_2$ may be configured as a Third Generation (3G) smartphone (e.g., to hide the type of cellular technology of the user device 103 that user 102 uses). For example, where user device 103 of user 102 is a laptop computer, the virtual user device $153_1$ may be configured as a desktop computer, the virtual user device $153_2$ may be configured as a laptop computer of a different brand, the virtual user device $153_3$ may be configured as a tablet computer, the virtual user device $153_4$ may be configured as a smart phone, and the virtual user device $153_5$ may be configured as a gaming console. It will be appreciated that the foregoing examples are merely a few of the types of details, of the user device 103 that is actually used by user 102, that may be hidden. It is noted that the foregoing examples are merely a few of the ways in which details of the user device 103 that is actually used by user 102 may be hidden. It will be appreciated that, although primarily depicted and described with respect to use of a single user device 103 by user 102, the user 102 may use any suitable number of user devices 103 and one or more virtual user devices 153 may be used to hide details of one or more of the user devices 103. Thus, the virtual user devices 153 may provide various flavors of user devices that the user 102 may utilize to hide various aspects of his or her life.

The virtual user devices 153 may be selected from or generated based on user device profiles representing real user devices or communication application profiles representing real communication applications which may be used by real user devices. For example, the user device profiles may include profiles for different brands and models of communication devices (e.g., profiles for different brands and models of desktop computers, profiles for different brands and models of laptop computers, profiles for different brands and models of smartphones, or the like. Similarly, for example, the communication application profiles may include profiles for different types of communication applications (e.g., voice communication applications, text messaging applications, email applications, web browsing applications, or the like), specific communication applications, or the like. The various profiles may be maintained in one or more virtual libraries. The profiles may be selected for use as the virtual user devices 153. The profiles may be selected and customized for use as the virtual user device 153 (e.g., customized based on one or more of a user profile of the user 102, specific information related to the user device 103 of the user 102, one or more behavioral patterns of the user 102 in communicating via the user device 103, or the like). In at least some embodiments, the virtual user spaces 150 (or any other suitable elements or devices) may be configured to track usage patterns for user 102 for use in enhancing future actions initiated by the user 102 (e.g., future service requests, future services performed, or the like).

It will be appreciated that, although primarily depicted and described with respect to use of a specific number of virtual user spaces 150 for user 102, fewer or more virtual user spaces 150 may be used for user 102.

It will be appreciated that, although primarily depicted and described with respect to use of specific numbers and types of virtual user space hosts to provide virtual user spaces 150 (namely, the three SPNs 120), the virtual user spaces 150 for user 102 may be provided using any suitable numbers or types of virtual user space hosts. For example, fewer or more SPNs 120 may be used to host virtual user spaces 150. For example, hosts other than SPNs 120 may be used to host virtual user spaces 150 (e.g., cloud provider systems or the like). It will be appreciated that various combinations of such embodiments may be used.

As described above, the virtual user spaces 150 provide combinations of virtual user identities 152 and virtual user devices 153, such that various aspects of the user identity of user 102 or the user device 103 used by user 102 may be hidden when the user 102 communicates via SPN $120_1$ (e.g., for voice calls, emailing, instant messaging, web browsing requests, web-based transactions, use of cloud services 130, or the like). The virtual user spaces 150, including the respective virtual user identities 152 and virtual user devices 153, may be used as proxies for the user 102 and the user device 103, such that an action performed by user 102 via user device 103 appears to have been performed by one of the virtual user spaces 150 (illustratively, by the virtual user identity 152 or virtual user device 153 of the virtual user space 150 that is used to perform the action on behalf of user 102). An exemplary use of virtual user spaces 150 to handle actions initiated or performed by user 102 via user device 103 is depicted and described with respect to FIG. 2.

Figure 2:
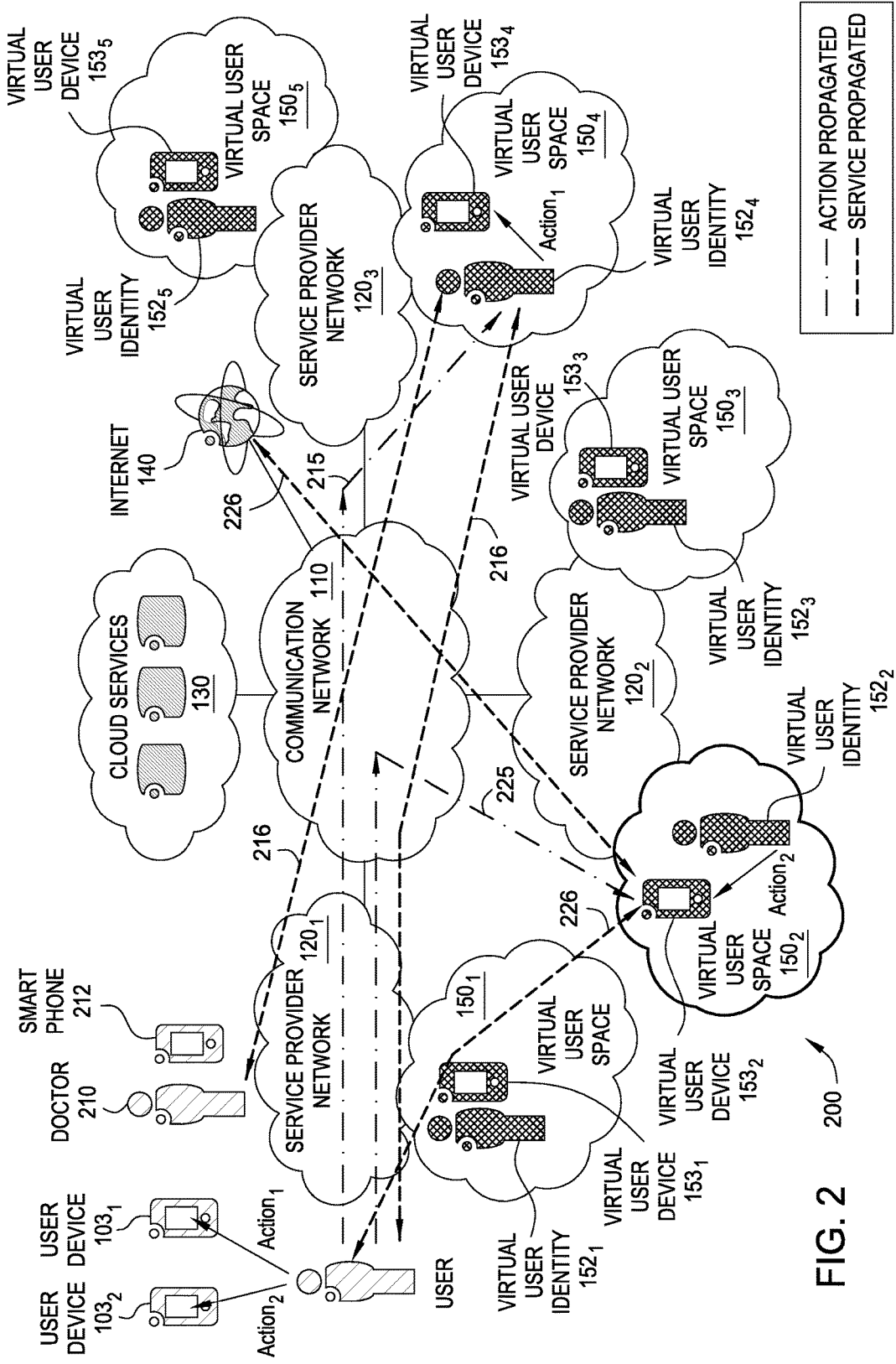
FIG. 2 depicts use of virtual user spaces of the communication system of FIG. 1 to perform exemplary actions.

FIG. 2 depicts use of virtual user spaces of the communication system of FIG. 1 to perform exemplary actions. As depicted in FIG. 2, user 102 has two user devices (illustratively, first user device $103_1$ and second user device $103_2$) available for use in communicating via the communication system 100.

In a first example, user 102 initiates a first action (Action$_1$) via first user device $103_1$. The first action is an initiation of a voice call with a doctor 210 who has a smart phone 212. In this example, rather than the voice call being initiated in the normal manner, an indication of the first action is propagated from the first user device $130_1$ to the virtual user space $150_4$ of SPN $120_3$ (which includes virtual user identity $152_4$ and virtual user device $153_4$). This is indicated in FIG. 2 by signaling 215. The virtual user resources of virtual user space $150_4$ process the indication of the first action in order to identify the first action requested by the user 102 via first user device $103_1$. In this case, the virtual user resources of virtual user space $150_4$ determine that the user 102 initiated a voice call to smart phone 212 of doctor 210. The virtual user space $150_4$, based on virtual user identity $152_4$ and virtual user device $153_4$, then initiates the voice call to the smart phone 212 of doctor 210. For example, the voice call establishment signaling, rather than identifying the real name of user 102 and real device information associated with first user device $103_1$, may indicate a virtual user identifier of the user 102 (e.g., based on virtual user identity $152_4$) and virtual user device information of first user device $103_1$ (e.g., including at least some information that is different than the real user device information associated with the first user device $103_1$). The voice call, once established, may then proceed between first user device $103_1$ of user 102 and the smartphone 212 of doctor 210 via the virtual user space $150_4$. This is indicated in FIG. 2 by traffic flow 216. In this manner, the identities of user 102 and first user device $103_1$ may be hidden from any entity or individual that detects or intercepts details related to the voice call between the user 102 and the doctor 210.

In a second example, user 102 initiates a second action ($Action_2$) via second user device $103_2$. The second action is an initiation of a request to a web server 222 available via the Internet 140. In this example, rather than the web request being initiated in the normal manner, an indication of the second action is propagated from the second user device $130_2$ to the virtual user space $150_2$ of SPN $120_2$ (which includes virtual user identity $152_2$ and virtual user device $153_2$). This is indicated in FIG. 2 by signaling 225. The virtual user resources of virtual user space $150_2$ process the indication of the second action in order to identify the second action requested by the user 102 via second user device $103_2$. In this case, the virtual user resources of virtual user space $150_2$ determine that the user 102 initiated a web request to web server 222. The virtual user space $150_2$, based on virtual user identity $152_2$ and virtual user device $153_2$, then initiates the web request to the web server 222. This is indicated in FIG. 2 by web request 225. For example, the web request 225, rather than identifying the real name of user 102 and real device information associated with second user device $103_2$, may indicate a virtual user identifier of the user 102 (e.g., based on virtual user identity $152_2$) and virtual user device information of second user device $103_2$ (e.g., including at least some information that is different than the real user device information associated with the second user device $103_2$). The web server 222 receives the web request 225 and responds with an associated web response, which is directed by web server 222 to the virtual user space $150_2$ based on information included in the web request by virtual user space $150_2$. This is indicated in FIG. 2 as web response 226. The virtual user space $150_2$ receives the web response 226 and propagates the web response 226 to the second user device $103_2$, such that the web response 226 may be presented to the user 102. In this manner, the identities of user 102 and second user device $103_2$ may be hidden from the web server 222 as well as from any entity or individual that detects the web transaction between the second user device $103_2$ and the web server 222.

It will be appreciated that the foregoing examples are merely two of the various ways in which virtual users spaces 150 may be used to hide various details related to communications by user 102 using user devices 103. For example, virtual user spaces 150 may be used to hide various details related to emails sent by user 102 using a user device 103, text messages sent by user 102 using a user device 103, instant messages sent by user 102 using a user device 103, web browsing performed by user 102 using a user device 103, use of cloud services 130 by user 102 using a user device 103, or the like. The various ways in which the virtual user spaces 150 may be used to hide various details related to communications by user 102 using user devices 103 may be better understood by way of reference to FIG. 3.

Figure 3:
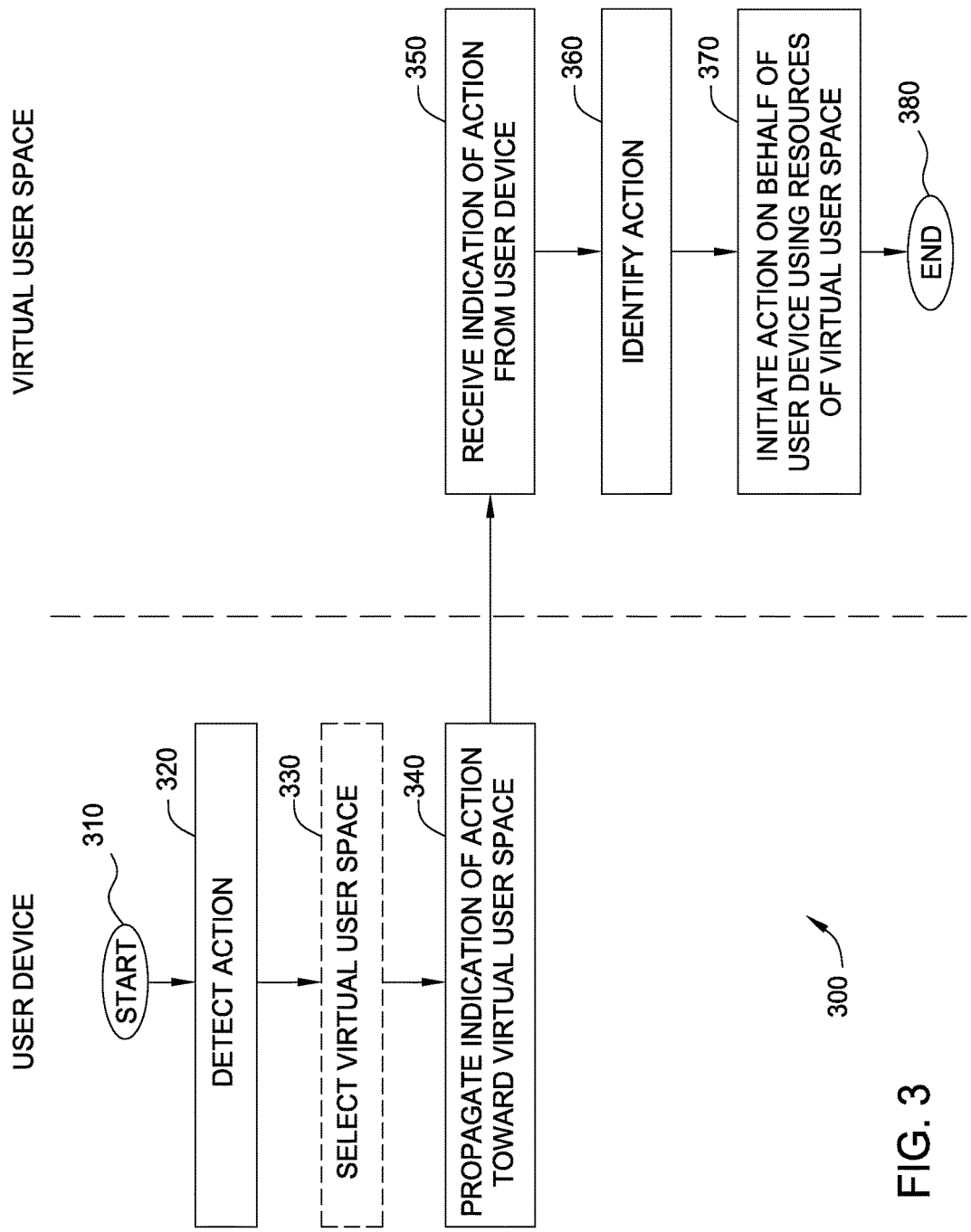
FIG. 3 depicts one embodiment of a method for using a virtual user space of a user to hide one or more aspects of a communication by the user.

FIG. 3 depicts one embodiment of a method for using a virtual user space of a user to hide one or more aspects of a communication by the user. It will be appreciated that, although primarily depicted and described as being performed serially, at least a portion of the steps of method 300 may be performed contemporaneously or in a different order than depicted in FIG. 3. As depicted in FIG. 3, a portion of the steps are performed by a user device of the user and a portion of the steps are performed by a virtual user space of the user.

At step 310, method 300 begins.

At step 320, an action is detected at the user device. The action may be initiating a request for a service, initiating a service, performing a service or a part of a service, or the like, as well as various combinations thereof. For example, as discussed in the examples of FIG. 2, the action may be initiation of a voice call, sending of an email, sending of a text message, sending of an instant message, sending of a web browsing request, sending of a web-based transaction a request for use of a web-based service, or the like.

At step 330 (an optional step), the virtual user space is selected for the user. The virtual user space may be selected from among a plurality of virtual user spaces available for use by the user. The virtual user space may be selected based on information associated with the action (e.g., the action initiated or requested, the type of action initiated or requested, a real user identity used to initiate the action, the user device from which the action is initiated, or the like, as well as various combinations thereof). The virtual user space may be selected by a configurable user profile capability. The virtual user space may be selected by the user or by the user device on behalf of the user.

At step 340, the user device propagates an indication of the action toward the virtual user space.

At step 350, the virtual user space receives the indication of the action from the user device.

At step 360, the virtual user space identifies the action detected at the user device. The virtual user space may identify the action detected at the user device based on analysis of the indication of the action received from the user device.

At step 370, the virtual user space initiates the action on behalf of the user using virtual user resources of the virtual user space. The virtual user space may initiate the action using at least one of a virtual user identity that is maintained by the virtual user space or a virtual user device that is maintained by the virtual user space. In at least some embodiments, the virtual user space may initiate the action using one or more of the other secure communication capabilities depicted and described herein (e.g., a user communication pattern hiding capability, a user browsing pattern hiding capability, a gateway hopping capability, or the like, as well as various combinations thereof).

At step 380, method 300 ends.

It will be appreciated that, although primarily depicted and described with respect to an embodiment in which selection of the virtual user space for the action is performed by the user device, in at least one embodiment selection of the virtual user space for the action may be performed on the path between the user device and the virtual user space (e.g., by a network device on behalf of the user device).

It will be appreciated that method 300 only describes the initial handling of the request for an action initiated by the user via the user device. This is at least partially due to the fact that subsequent steps performed by the virtual user space and the user device may depend on the type of action initiated by the user via the user device. It will be appreciated that after the virtual user space initiates the action on behalf of the user device, the virtual user space may initiate one or more additional actions on behalf of the user device, receive one or more responses related to the action initiated by the virtual user space, direct one or more responses to the user device, operate as an intermediary for supporting communications between the user device and one or more other devices, or the like, as well as various combinations thereof. These additional functions may be better understood by considering the examples depicted and described with respect to FIG. 2.

It will be appreciated that, although primarily depicted and described with respect to embodiments in which the user behavior pattern hiding capability is used for hiding aspects of actions initiated by a user, in at least some embodiments the user behavior pattern hiding capability may be used for hiding aspects of actions initiated on behalf of a user (e.g., initiated by a user device of the user on behalf of the user, initiated by a network device on behalf of the user, or the like).

It will be appreciated that, although primarily depicted and described with respect to embodiments in which the user behavior pattern hiding capability is used for hiding aspects of actions initiated by a user, in at least some embodiments the user behavior pattern hiding capability may be used for hiding aspects of actions initiated for communication with the user (e.g., a call placed to a user device of the user, an email sent to the user, an instant message sent to the user, a push-based web notification service sending updates to the user, or the like).

It will be appreciated that, although primarily depicted and described with respect to embodiments in which the user behavior pattern hiding capability is used for hiding aspects of actions which may be interpreted as being patterns associated with communications by the user, in at least some embodiments the user behavior pattern hiding capability may be used for hiding aspects of actions which do not necessarily form part of or otherwise contribute to patterns associated with communications by the user.

In at least some embodiments, a user communication pattern hiding capability is provided. The user communication pattern hiding capability is configured to hide various types of patterns associated with communications by a user.

Figure 4:
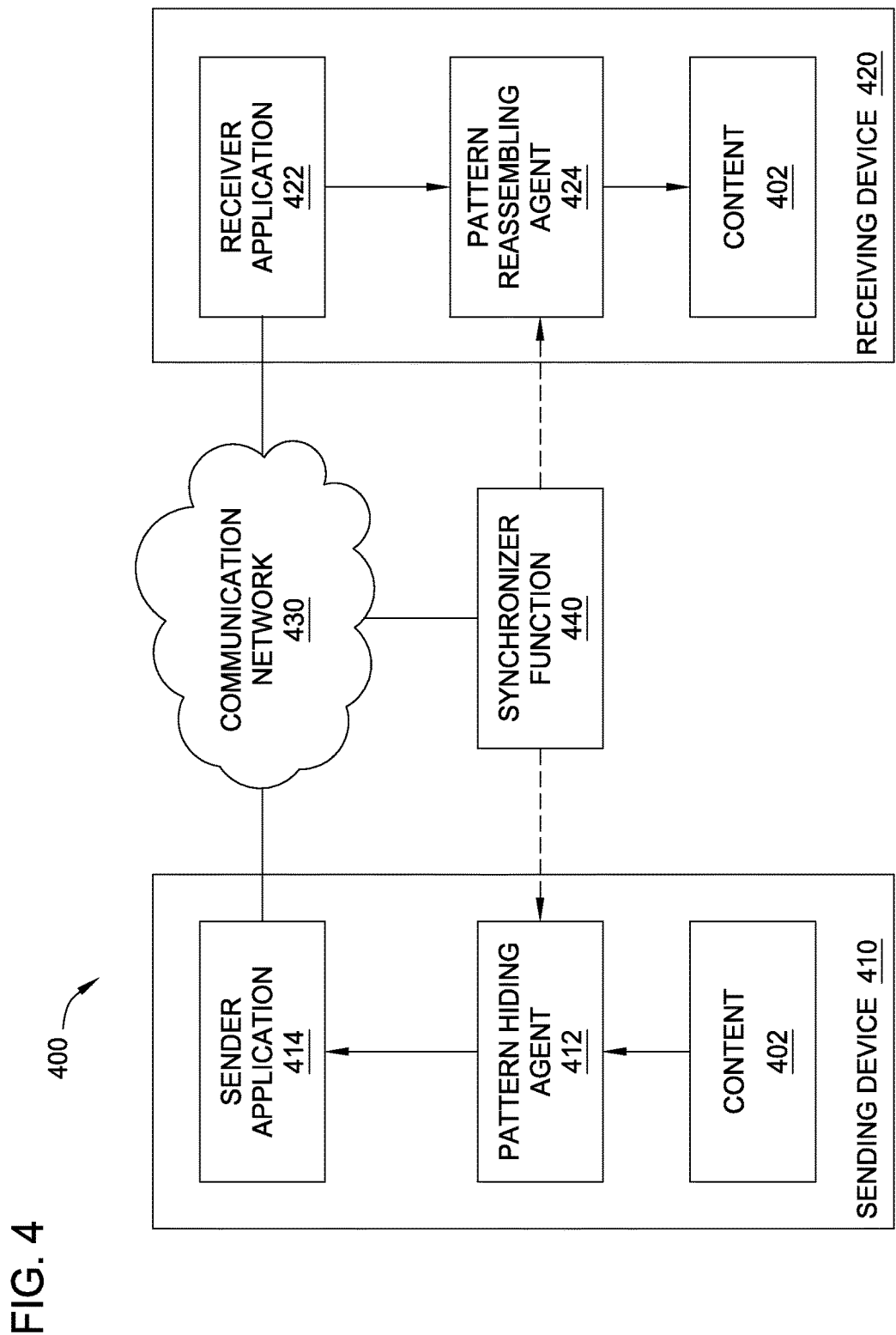
FIG. 4 depicts an exemplary communication system configured to support a user communication pattern hiding capability.

FIG. 4 depicts an exemplary communication system configured to support a user communication pattern hiding capability.

The exemplary communication system 400 includes a sending device 410 and a receiving device 420, where sending device 410 and receiving device 420 are configured to communicate via a communication network 430. The sending device 410 is configured to send content 402 to receiving device 420. The content 402 may include voice content of a voice call, an e-mail, a text message, an instant message, a web browsing request, video content of a video session, or the like, as well as various combinations thereof. The exemplary communication system 400 also includes a synchronizer function 440.

The sending device 410 is configured to communicate with receiving device 420. For example, the sending device 410 may be a user device (e.g., of an individual user, of a corporate user where the sending device 410 is part of the corporate Intranet, or the like) or a network device (e.g., a server or other type of network device). The sending device includes 410 includes a pattern hiding agent 412 and a sender application 414. The pattern hiding agent 412 is configured to receive the content 402 and to provide one or more pattern hiding functions for hiding one or more patterns which may be associated with communication of content 402 from sending device 410 to receiving device 420. The sending application 414 is configured to receive processed content from pattern hiding agent 412 and to provide the processed content toward receiving device 420.

The receiving device 420 is configured to communicate with sending device 410. For example, the receiving device 410 may be a user device (e.g., of an individual user, of a corporate user where the receiving device 420 is part of the corporate Intranet, or the like) or a network device (e.g., a server or other type of network device). The receiving device includes 420 includes a receiver application 422 and a pattern reassembling agent 424. The receiver application 422 is configured to receive processed content from sending device 410 and to provide the processed content to pattern reassembling agent 424. The processed content is a version of content 402 that was processed at sending device 410. The pattern reassembling agent 424 is configured to receive the processed content from receiver application 422 and to perform one or more reassembling functions to reverse the pattern hiding operations performed by the pattern hiding agent 412 on content 402 at the sending user device 110 and, thus, to recover the content 402 and the receiving device 420.

The synchronizer function 440 is configured to synchronize the pattern hiding functions and the pattern reassembling functions performed by the pattern hiding agent 412 and the pattern assembling agent 424, respectively. It will be appreciated that, although primarily depicted and described with respect to an embodiment in which the synchronizer function 440 is implemented within the network, in at least one embodiment, the synchronizer function 440 may be implemented as part of sending device 410, as part of receiving device 420, as part of one or more other network elements, or the like, as well as various combinations thereof.

In at least some embodiments, pattern hiding is performed via partitioning of content 402 into content partitions, rearranging of the content portions, and sending of the content portions from sending device 410 to receiving device 420. In this embodiment, the pattern hiding agent 412 is configured to partition the content 402 into content portions, rearrange the content portions into a different format, and provide the content portions to sender application 414 for transmission toward receiving device 420. In this embodiment, the pattern reassembling agent 424 is configured to receive the content portions from receiver application 422 and to reassemble the content portions to recover content 402. The synchronizer function 440 is configured to synchronize the operation of pattern hiding agent 412 and pattern reassembling agent 424 such that the partitioning and rearranging functions performed by pattern hiding agent 412 may be reversed by corresponding reordering and combining functions performed by pattern reassembling agent 424. For example, synchronizer function 440 may instruct pattern hiding agent 412 as to the manner in which the partitioning and rearranging is to be performed and, similarly, may instruct pattern reassembling agent 424 as to the corresponding manner in which the reordering and combining is to be performed to recover content 402. For example, synchronizing function 440 may determine the manner in which the partitioning and rearranging is being performed by pattern hiding agent 412 and then inform pattern reassembling agent 424 as to the corresponding manner in which the reordering and combining is to be performed to recover content 402. The partitioning and rearranging of the content portions for transmission via communication network 430 ensures that any individual or entity intercepting the communication from the sending device 410 to the receiving device 420 will not be able to identify the content 402 actually sent by sending device 410.

In at least some embodiments, pattern hiding is performed via addition of shield content to content 402 to form a full set of content that is transmitted from sending device 410 to receiving device 420. In this embodiment, the pattern hiding agent 412 is configured to obtain shield content, add the shield content to content 402 to form a full set of content, and to provide the full set of content to sender application 414 for transmission toward receiving device 420. The pattern hiding agent 412 may obtain the shield content in any suitable manner (e.g., generating the shield content locally on-the-fly, accessing pre-computed shield content locally or remotely, receiving shield content from synchronizer function 440, or the like, as well as various combinations thereof). In this embodiment, the pattern reassembling agent 424 is configured to receive the full set of content from receiver application 422, to identify the shield content in the full set of content, and to remove the shield content from the full set of content to recover content 402. The synchronizer function 440 is configured to synchronize the operation of pattern hiding agent 412 and pattern reassembling agent 424 such that the shield content addition functions performed by pattern hiding agent 412 may be reversed by corresponding shield content removal functions performed by pattern reassembling agent 424. For example, synchronizer function 440 may instruct pattern hiding agent 412 as to the manner in which the shield content is to be added and, similarly, may instruct pattern reassembling agent 424 as to the corresponding manner in which the shield content is to be removed to recover content 402. For example, synchronizing function 440 may determine the manner in which the shield addition is being performed by pattern hiding agent 412 and then inform pattern reassembling agent 424 as to the corresponding manner in which the shield removal is to be performed to recover content 402. It will be appreciated that the shield content added to content 402 may be content that is similar to content 402 (e.g., additional voice content where the content 402 is voice content, additional data for an instant message where content 402 is an instant message, additional data for an e-mail message where the content 402 is an e-mail message, one or more shield web searches where the content 402 is a web search, or the like) or content that is independent of the content 402. An exemplary embodiment of a user browsing pattern hiding capability is depicted and described with respect to FIGS. 5 and 6. The addition of the shield content to the content 402 prior to transmission via communication network 430 ensures that any individual or entity intercepting the communication from the sending device 410 to the receiving device 420 will not be able to identify the content 402 actually sent by sending device 410.

In at least some embodiments, pattern hiding is performed via partitioning of content 402 into content portions and sending of the content portions from sending device 410 to receiving device 420 via multiple traffic gateways and, thus, multiple network paths. In this embodiment, the pattern hiding agent 412 is configured to partition the content 402 into content portions and to provide the content portions to sender application 414, and the sender application 414 is configured to distribute the content portions across multiple traffic gateways for transmission toward receiving device 420 via multiple network paths. In this embodiment, the receiver application 422 is configured to receive the content portions on multiple network paths and to provide the content portions to pattern reassembling agent 424, and the pattern reassembling agent 424 is configured to receive the content portions from receiver application 422 and to reassemble the content portions to recover content 402. The synchronizer function 440 is configured to synchronize the operation of pattern hiding agent 412 and pattern reassembling agent 424 such that the partitioning functions performed by pattern hiding agent 412 may be reversed by corresponding combining functions performed by pattern reassembling agent 424. For example, synchronizer function 440 may instruct pattern hiding agent 412 as to the manner in which the partitioning and is to be performed and, similarly, may instruct pattern reassembling agent 424 as to the corresponding manner in which the combining is to be performed to recover content 402. For example, synchronizing function 440 may determine the manner in which the partitioning is being performed by pattern hiding agent 412 and then inform pattern reassembling agent 424 as to the corresponding manner in which the combining is to be performed to recover content 402. The use of multiple traffic gateways to send the content portions ensures that different portions of the content 402 will take different network paths from the sending device 410 to the receiving device 420, thereby ensuring that any individual or entity intercepting information on one of the network paths will be unable to access the full set of content 402 actually sent by sending device 410. An exemplary embodiment illustrating use of multiple traffic gateways is depicted and described with respect to FIG. 5.

It will be appreciated that the pattern hiding agent 412 and pattern reassembling agent 424 may be configured to provide various combinations of such pattern hiding functions in order to hide one or more patterns associated with delivery of content 402 from sending device 410 to receiving device 420.

Figure 5:
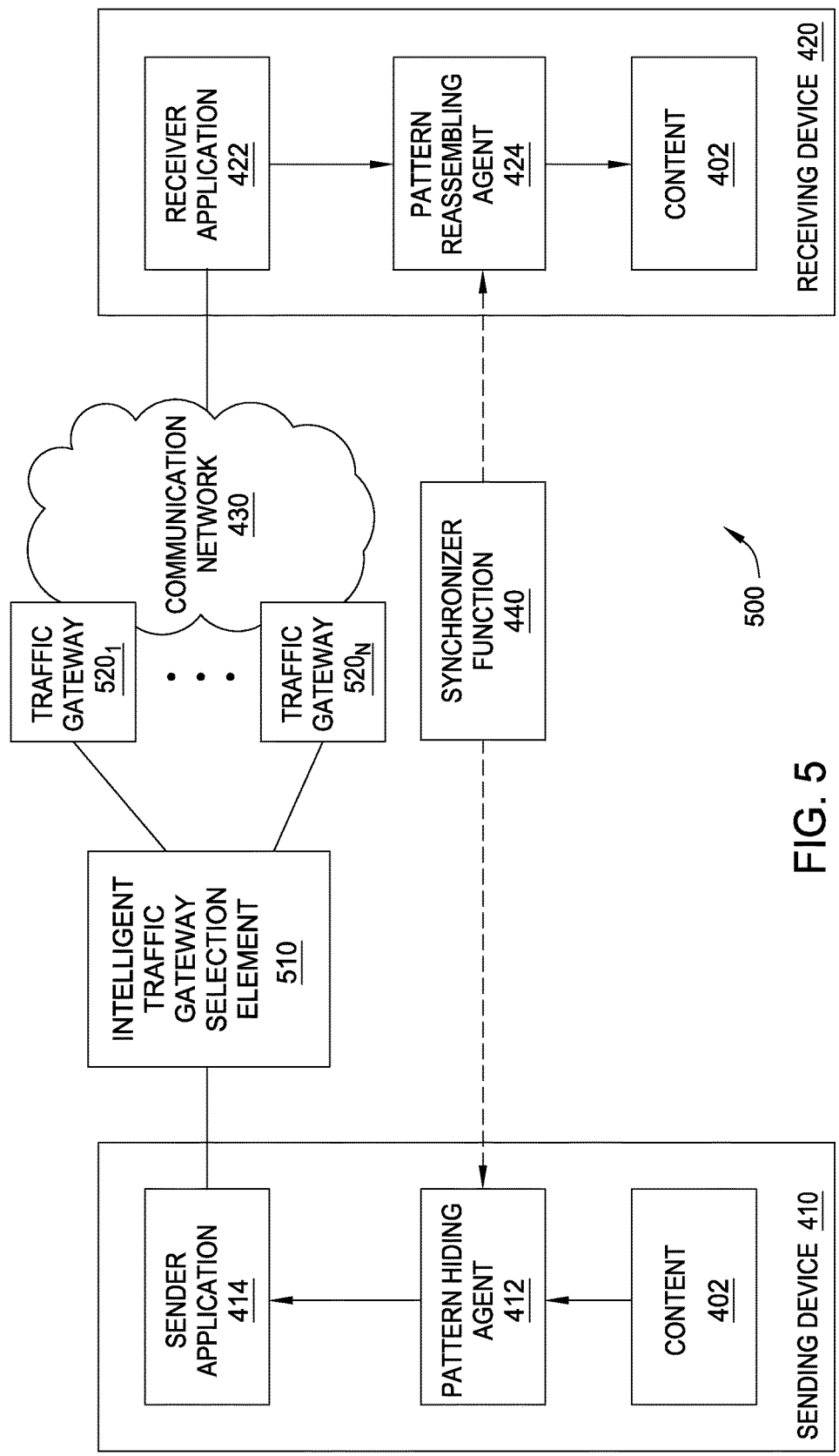
FIG. 5 depicts an exemplary embodiment illustrating use of multiple traffic gateways within the exemplary communication system of FIG. 4.

FIG. 5 depicts an exemplary embodiment illustrating use of multiple traffic gateways within the exemplary communication system of FIG. 4.

As depicted in FIG. 5, the exemplary communication system 500 of FIG. 5 is similar to the exemplary communication system 400 of FIG. 4, including sending device 410, receiving device 420, and communication network 430 depicted and described with respect to FIG. 4, as well as an intelligent traffic gateway selection element 510 and a plurality of traffic gateways $520_1$-$520_N$ (collectively, traffic gateways 520).

The intelligent traffic gateway selection element 510 is disposed between sender application 414 and communication network 430. The intelligent traffic gateway selection element 510 is configured to receive data from sender application 414 and to distribute the data to the traffic gateways 520 for transmission toward receiving device 420. The intelligent traffic gateway selection element 510 sends respective portions of the data to traffic gateways 520, such that different portions of the data traverse different paths via communication network 430 to receiving device 430. The data portions may include content portions when pattern hiding agent 412 partitions content 402 into content portions. The data portions may each include real content 402 and shield content when pattern hiding agent 412 adds shield content to content 402. The distribution of the data from pattern hiding agent 412 across the traffic gateways 520 may be performed in any other suitable manner.

The traffic gateways $520_1$-$520_N$ each are configured to receive data from intelligent traffic gateway selection element 510 and to propagate the received data toward receiving device 420. For example, the traffic gateways 520 may be (or form part of) corporate gateways where sending device 410 is a device behind a corporate firewall, service provider access gateways via which sending device 410 may access communication network 430 (e.g., when communication network 430 includes a service provider network), or the like. For example, the traffic gateways 520 may be (or form part of) switches, routers, or the like. The traffic gateways 520, upon receiving data from intelligent traffic gateway selection element 510, propagate the received data toward receiving device 420 using typical data forwarding/routing schemes, such that the portions of data traverse different network paths between sending device 410 and receiving device 420.

Figure 6:
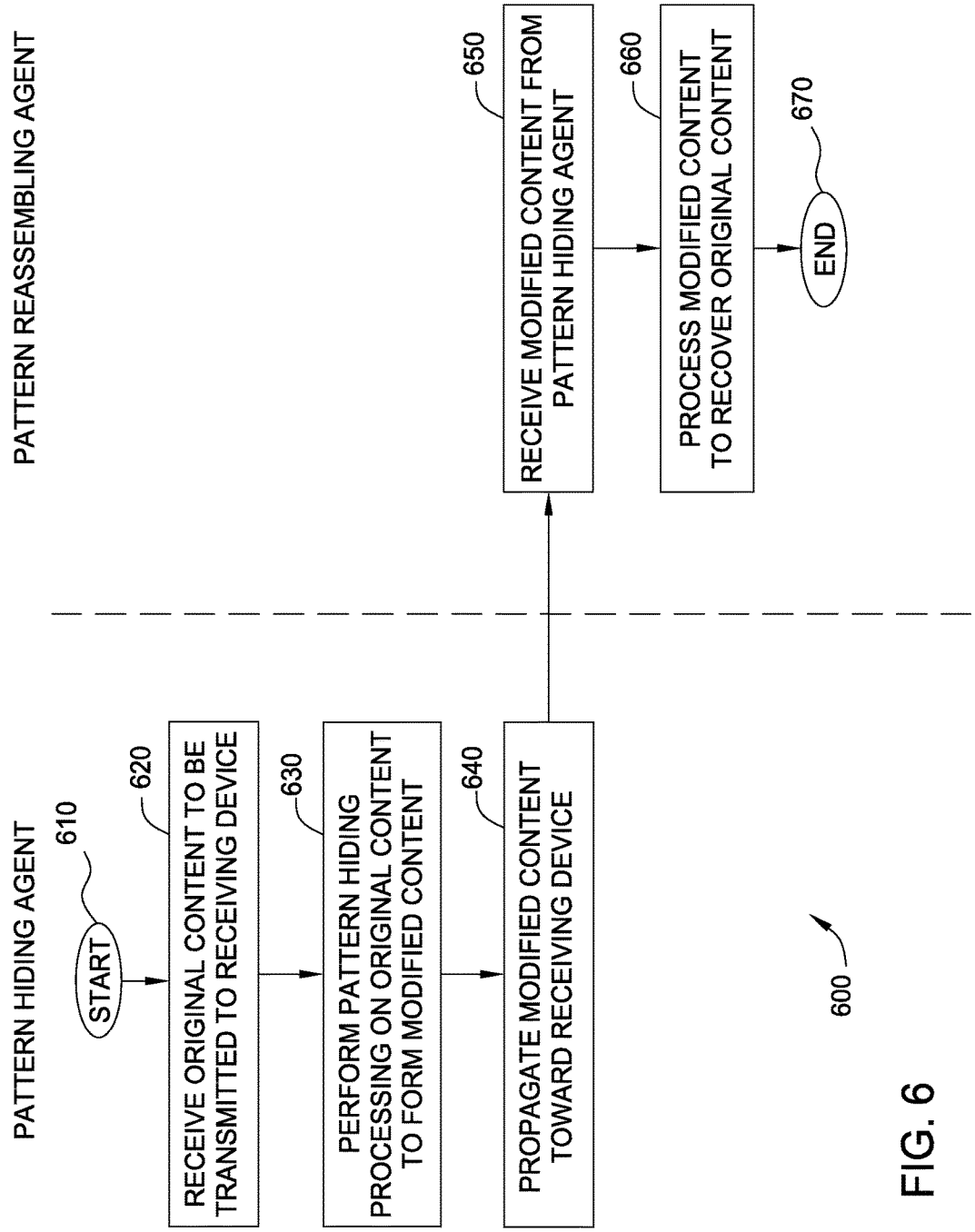
FIG. 6 depicts one embodiment of a method for providing a user communication pattern hiding capability.

FIG. 6 depicts one embodiment of a method for providing a user communication pattern hiding capability. It will be appreciated that, although primarily depicted and described as being performed serially, at least a portion of the steps of method 600 may be performed contemporaneously or in a different order than depicted in FIG. 6. As depicted in FIG. 6, a portion of the steps are performed by a pattern hiding agent that is associated with a sending device and a portion of the steps are performed by a pattern reassembling agent that is associated with a receiving device. At step 610, method 600 begins. At step 620, the pattern hiding agent receives original content to be transmitted to the receiving device. At step 630, the pattern hiding agent performs pattern hiding processing on the original content, thereby forming modified content. At step 640, the pattern hiding agent propagates the modified content toward the receiving device. At step 650, the pattern reassembling agent receives the modified content from the pattern hiding agent. At step 660, the pattern reassembling agent processes the modified content to recover the original content. At step 670, method 600 ends. The operation of method 600 of FIG. 6 may be better understood by way of reference to FIG. 4.

In at least some embodiments, a user browsing pattern hiding capability is provided. The user browsing pattern hiding capability is configured to hide various types of patterns associated with web browsing performed by a user.

In at least some embodiments, the web browsing pattern hiding capability hides the web browsing pattern of the user by supplementing the real web browsing transactions of the user with fake (or shield) web browsing transactions. It will be appreciated that the web browsing transactions may include web browsing requests (e.g., including search terms), web browsing results (e.g., including lists of results identified using associated search terms, or the like. The supplementation of the real web browsing transactions with the fake web browsing transactions ensures that any device or person able to access the web browsing transactions of the user (e.g., via a snooping mechanism or other mechanisms) will be presented with the full set of real and fake web browsing transactions of the user and, as a result, will be unable to distinguish the real web browsing transactions from the fake web browsing transactions. Thus, the device or person accessing the web browsing transactions of the user will be unable to determine the set of real web browsing transactions that are actually of interest to the user.

Figure 7:
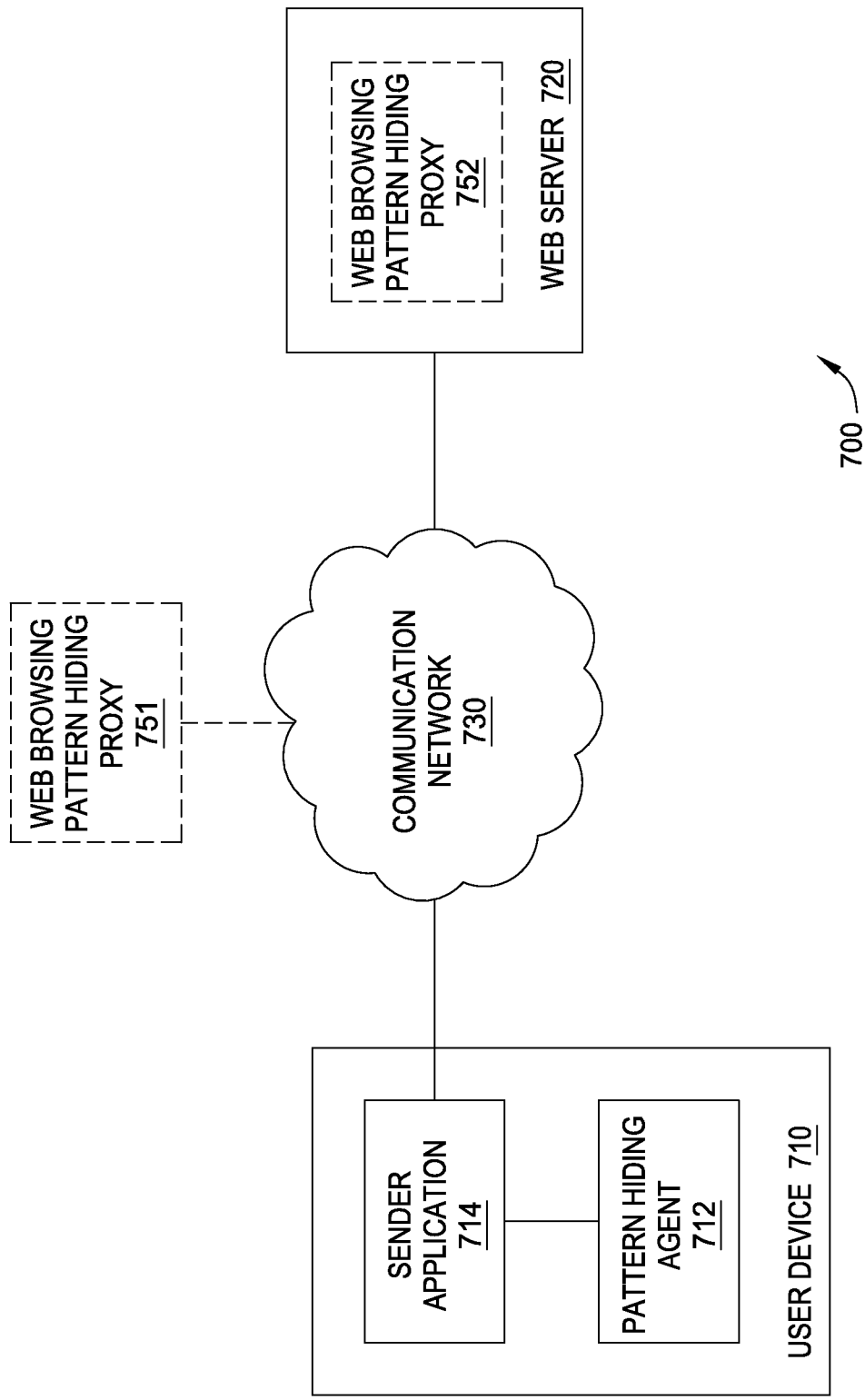
FIG. 7 depicts an exemplary communication system configured to support a user browsing pattern hiding capability.

FIG. 7 depicts an exemplary communication system configured to support a user browsing pattern hiding capability.

As depicted in FIG. 7, exemplary communication system 700 includes a user device 710 and a web server 720, as well as a communication network 730 supporting communications between the user device 710 and the web server 720.

The user device 710 is configured to provide web browsing requests to web server 720 via communication network 730 and receive associated web browsing responses from web server 720 via communication network 730. For example, the user device 710 may be a desktop computer, a laptop computer, a tablet computer, a smart phone, a cell phone or the like. The user device 710 includes a pattern hiding agent 712 and a search application 714.

The user device 710 is configured to enable an end user to specify and submit a web browsing request. For example, the end user may submit a web browsing request from a web browsing application available on the user device 710. The web browsing request specified by the end user is referred to herein as a real web browsing request. The real web browsing request includes one or more real search terms or strings. In at least some embodiments, the pattern hiding agent 712 is configured to generate one or more fake web browsing requests associated with the real web browsing request, and the pattern hiding agent 712 also is configured to provide the real and fake web browsing requests to the search application 714. In at least some embodiments, the pattern hiding agent 712 is configured to provide the real web browsing request to the search application 714, and the search application 714 is configured to generate one or more fake web browsing requests associated with the real web browsing request. The search application 714 is configured to propagate the real and fake web browsing requests toward the web server 720 via communication network 730.

The web server 720 is configured to receive web browsing requests from user device 710 via communication network 730 and to provide web browsing responses to user device 710 via communication network 730. The web server 720 receives the real and fake web browsing requests from user device 710. The web server 720 determines associated web browsing responses for each of the real and fake web browsing requests, thereby resulting in real web browsing responses and fake web browsing responses, and provides the real and fake web browsing responses to the user device 710. It will be appreciated that use of fake web browsing requests may be transparent to web server 720, such that web server 720 merely sees a number of web browsing requests that need to be served and serves the web browsing requests without regard for which web serving requests may be real and which web serving requests may be fake (i.e., implementation of the user browsing pattern hiding capability does not necessarily require any changes to existing web servers). For example, web server 720 may be a Hypertext Transfer Protocol (HTTP) server or any other suitable type of web-based server.

The user device 710 is configured to receive the real and fake web browsing responses from web server 720. The search application 714 receives the real and fake web browsing responses from web server 720. In at least some embodiments, the search application 714 is configured to filter the fake web browsing responses and provide the real web browsing responses to the pattern hiding agent 712 (e.g., which may be performed under the direction of pattern hiding agent 712). In at least some embodiments, the search application 714 is configured to provide the real and fake web browsing responses to the pattern hiding agent 712, and the pattern hiding agent 712 is configured to filter the fake web browsing responses. The pattern hiding agent 712 is configured to propagate the real web browsing response for presentation to the end user (e.g., via the web browsing application from which the web browsing request was initiated by the end user). In this manner, fake searches may be used to hide the real web searches that are actually performed by the user without requiring the user to also view the fake search results associated with the fake searches.

It will be appreciated that, although primarily depicted and described with respect to an embodiment in which the pattern hiding functions are performed on the user device 710, in at least one embodiment at least a portion of the pattern hiding functions may be performed by one or more other devices (e.g., by a web browsing pattern hiding proxy 751 associated with communication network 730, by a web browsing pattern hiding proxy 752 implemented as part of web server 720, or the like, as well as various combinations thereof).

In at least some embodiments, the real web browsing request may be propagated from user device 710 without any associated generation of fake web browsing requests by user device 710. The web browsing pattern hiding proxy 751 receives the real web browsing request, generates one or more fake web browsing requests, and propagates the real and fake web browsing requests toward web server 720. In this embodiment, the fake web browsing responses provided by the web server 720 based on the fake web browsing requests may be filtered out by the web browsing pattern hiding proxy 751 or at user device 310. It will be appreciated that, although primarily depicted and described herein with respect to an embodiment in which web browsing pattern hiding proxy 751 is associated with communication network 730, the web browsing pattern hiding proxy 751 may be implemented at any suitable location along or associated with a communication path between the user device 710 and the web server 720 (e.g., at a server of a local network with which the user device 710 is associated, at a gateway of a local network with which the user device is associated, or the like).

In at least some embodiments, the real web browsing request may be propagated from user device 710 without any associated generation of fake web browsing requests by user device 710. The web browsing pattern hiding proxy 752 receives the real web browsing request. In at least some embodiments, web browsing pattern hiding proxy 752 generates one or more fake web browsing requests and the web server 720 generates real and fake web browsing responses and propagates the real and fake web browsing responses toward user device 710. In at least some embodiments, the web server 720 generates real and fake web browsing responses (without any explicit generation of fake web browsing requests) and propagates the real and fake web browsing responses toward user device 710. In such embodiments, the fake web browsing responses provided by the web server 720 may be filtered out by web browsing pattern hiding proxy 751 or at user device 710.

It will be appreciated that use of fake web browsing requests hides the web browsing pattern of the end user where the web browsing requests of the end user are accessed and that use of fake web browsing responses hides the web browsing pattern of the end user where the web browsing responses of the end user are accessed. It also will be appreciated that the locations at which the fake web browsing requests are generated and the fake web browsing responses are filtered may be selected based on determined or expected vulnerabilities of the path between user device 710 and the web server 720, such that fake web browsing transactions may be used in combination with the real web browsing transactions wherever real or potential vulnerabilities may exist or be expected.

Figure 8:
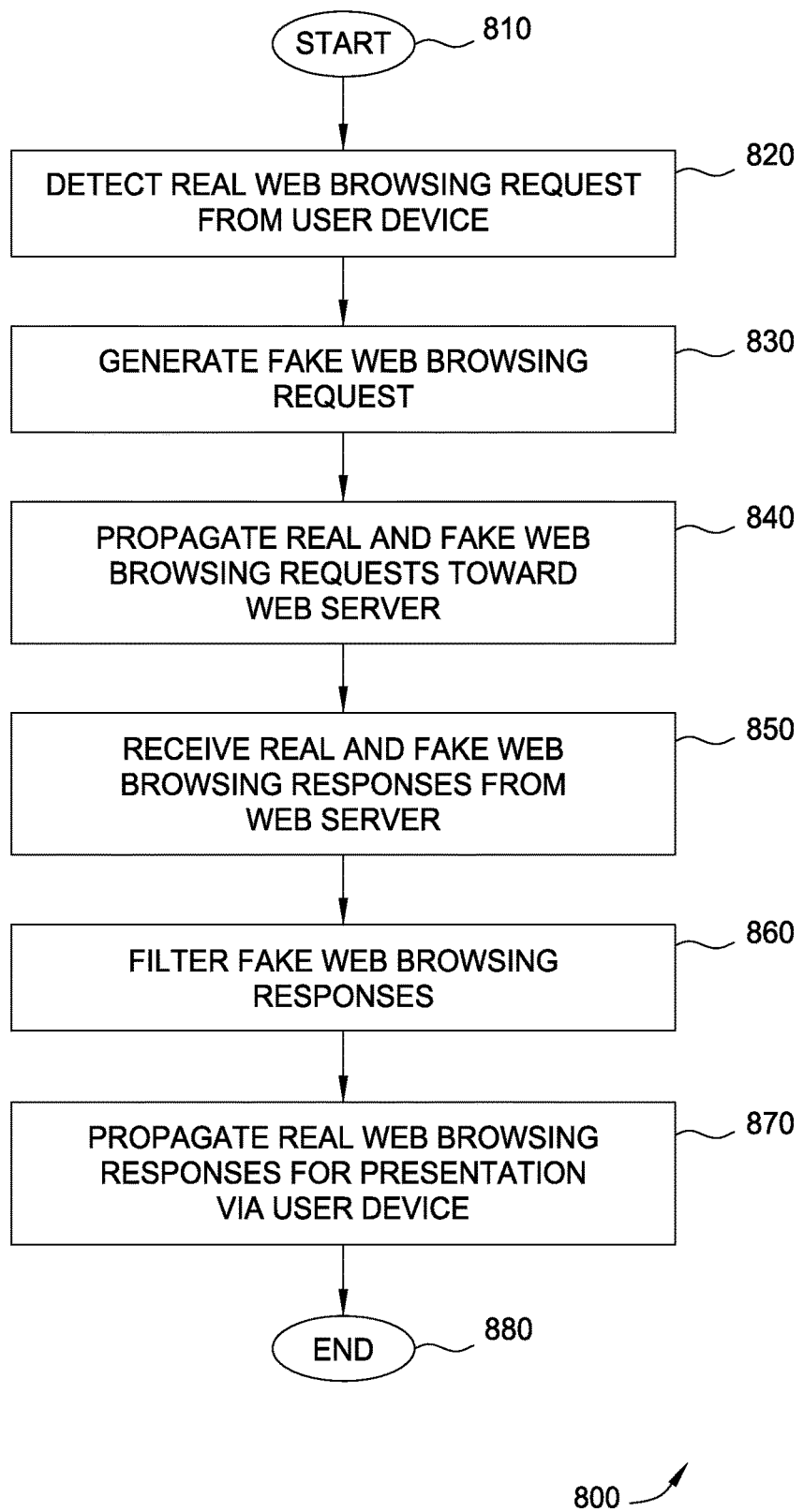
FIG. 8 depicts one embodiment of a method for providing a web browsing pattern hiding capability for an end user.

FIG. 8 depicts one embodiment of a method for providing a web browsing pattern hiding capability for an end user. Although depicted and described as being performed serially, it will be appreciated that at least a portion of the steps of method 800 may be performed contemporaneously or in a different order than presented in FIG. 8.

At step 810, method 800 begins.

At step 820, a real web browsing request from the user device is detected. The real web browsing request has one or more real search terms associated therewith. The one or more real search terms may be entered by the user or otherwise indicated by the user. The real search term(s) represent those terms for which the user is interested in receiving an associated web browsing response.

At step 830, a fake web browsing request is generated. The fake web browsing request has one or more fake search terms associated therewith. The one or more fake search terms may be provided by the user (e.g., in advance for use in later web browsing, currently at or near the time of the web browsing request, or the like), selected on behalf of the user (e.g., based on real web browsing request previously submitted by the end user, based on user profile information associated with the end user, or the like), or the like, as well as various combinations thereof. The fake search term(s) represent those search terms for which the user is uninterested in receiving an associated browsing response as they are only be provided for purposes of obfuscating the real search terms in which the user is interested. It will be appreciated, however, that the fake search terms may be at least partially related to the real search terms (e.g., in the case where an entity expected to be snooping the web browsing requests of the end user may have at least some indication as to the types of searches which might be performed by the end user).

At step 840, the real and fake web browsing requests are propagated toward a web server configured to generate and provide associated real and fake web browsing responses.

At step 850, real and fake web browsing responses are received from the web server.

At step 860, the fake web browsing responses are filtered so as to prevent presentation of the fake web browsing responses.

At step 870, the real web browsing responses are propagated for presentation via the user device.

At step 870, method 800 ends.

It will be appreciated that, although primarily depicted and described with respect to use of the web browsing pattern hiding capability to hide patterns in search terms, the web browsing pattern hiding capability may be used to hide patterns in any other suitable type(s) of search criteria (e.g., target of search, time frame for search, and the like, as well as various combinations thereof).

It will be appreciated that, although primarily depicted and described with respect to use of a one-to-one ratio of real web browsing requests to fake web browsing requests, any suitable ratio of real web browsing requests to fake web browsing requests may be used (e.g., for every X real web browsing requests, Y fake web browsing requests are generated and propagated).

It will be appreciated that, although primarily depicted and described with respect to initiation of one or more fake web browsing requests each time a real web browsing request is initiated, in at least one embodiment the one or more fake web browsing requests may only be generated in response to a determination to generate the one or more fake web browsing requests. This determination may be based on one or more criteria (e.g., a source device from which the real web browsing request is initiated, an intended destination of the real web browsing request, a desired or required level of security specified by the end user or a policy associated with the end user, or the like, as well as various combinations thereof. In one such embodiment, method 800 may be adapted by (1) including a decision step, between steps 820 and 830, for determining whether, in response to the real web browsing request, one or more fake web browsing requests are to be generated and propagated and (2) modifying the flow of method 800 such that if a determination is made to generate one or more fake web browsing requests then method 800 proceeds from step 820 to 830, otherwise method 800 proceeds to perform a standard web browsing process in which fake web browsing requests are not generated and fake web browsing responses are not generated and, thus, do not need to be filtered.

It will be appreciated that, although primarily depicted and described with respect to embodiments in which web browsing pattern hiding is performed at the user device, in at least some embodiments web browsing pattern hiding may be performed at a device other than the user device (e.g., by a server of a local network with which the user device is associated, at a gateway of a local network with which the user device is associated, by a network device within a communication network, and the like).

In at least some embodiments, a user pattern hiding proxy agent hopping capability is provided. The user pattern hiding proxy agent hopping capability is configured to use multiple distributed pattern hiding proxy agents to handle respective portions of a service for a user. An exemplary embodiment of a communication system configured to support the user pattern hiding proxy agent hopping capability is depicted and described with respect to FIG. 9.

Figure 9:
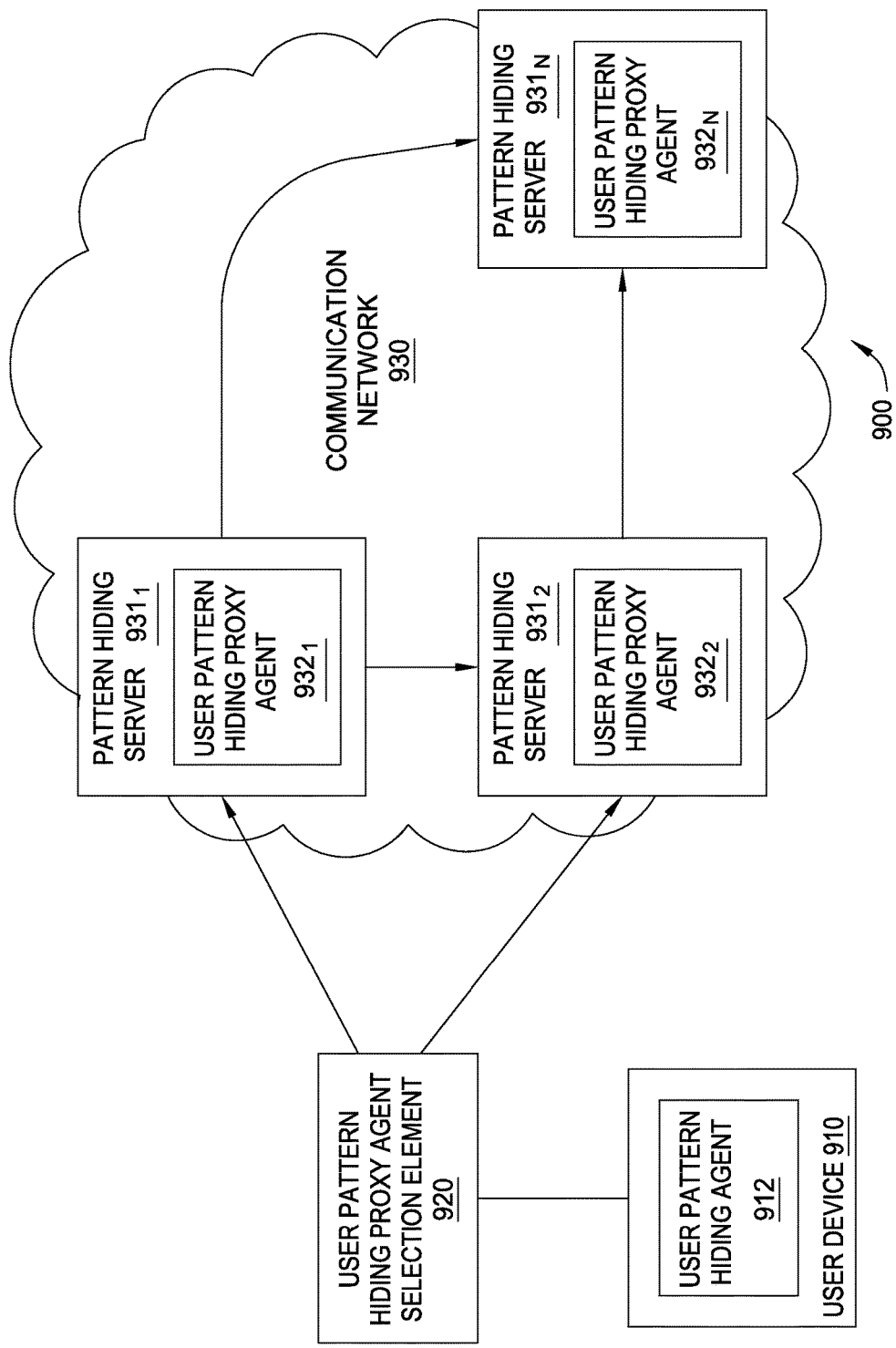
FIG. 9 depicts an exemplary communication system configured to support a user pattern hiding proxy agent hopping capability.

FIG. 9 depicts an exemplary communication system configured to support a user pattern hiding proxy agent hopping capability.

As depicted in FIG. 9, exemplary communication system 900 includes a user device 910, a user pattern hiding proxy agent selection element 920, and a communication network 930. The communication network 930 includes a plurality of pattern hiding servers $931_1$-$931_N$ (collectively, pattern hiding servers 931). The user device 910 includes a user pattern hiding agent 912 that is configured to provide pattern hiding for the user of user device 910. The pattern hiding servers $931_1$-$931_N$ host a plurality of user pattern hiding proxy agents $932_1$-$932_N$ (collectively, user pattern hiding proxy agents 932) for the user of user device 910, respectively.

The user device 910 is configured to access and use various types of services. The services may include services provided by communication network 930, services which may be accessed via communication network 930, or the like. For example, user device 910 may be a desktop computer, a laptop computer, a tablet computer, a smart phone, a cell phone, a set top box, a gaming console, a television, or the like.

The user pattern hiding agent 912 is configured to perform one or more pattern hiding functions at user device 910. For example, the user pattern hiding agent 912 may be configured to support a user behavior pattern hiding capability, a user communication pattern hiding capability, a user browsing pattern hiding capability, or the like, as well as various combinations thereof.

The user pattern hiding proxy agent selection element 920 is configured to select one or more of the user pattern hiding proxy agents 932 to handle a service (e.g., request for a service, initiation of a service, a traffic stream, or the like) for user device 910.

In at least some embodiments, the user pattern hiding proxy agent selection element 920 selects one of the user pattern hiding proxy agents 932 and propagates the service to the selected one of the user pattern hiding proxy agents 932. In this embodiment, the selected one of the user pattern hiding proxy agents 932 may then determine additional partitioning/forwarding of the service to one or more additional user pattern hiding proxy agents 932.

In at least some embodiments, the user pattern hiding proxy agent selection element 920 selects two or more of the user pattern hiding proxy agents 932 and propagates the service to one or more of the selected two or more of the user pattern hiding proxy agents 932. In this embodiment, user pattern hiding proxy agent selection element 920 may perform partitioning of the service into service portions and propagate the service portions to multiple of the selected two or more of the user pattern hiding proxy agents 932. In this embodiment, any of the selected user pattern hiding proxy agents 932 may then determine additional partitioning/forwarding of the service to one or more additional user pattern hiding proxy agents 932 (e.g., user pattern hiding proxy agents 932 selected by user pattern hiding proxy agent selection element 920 or user pattern hiding proxy agents 932 not initially selected by user pattern hiding proxy agent selection element 920).

The pattern hiding servers $931_1$-$931_N$ host the user pattern hiding proxy agents $932_1$-$932_N$ for the user of user device 910, respectively. It will be appreciated that, although omitted for purposes of clarity, each of the pattern hiding servers $931_1$-$931_N$ also may host other user pattern hiding proxy agents for other users having user devices. The pattern hiding servers 931 may be implemented as standalone elements or using existing network elements. The pattern hiding servers 931 may be provided using gateways, servers, switches, or the like, as well as various combinations thereof.

The user pattern hiding proxy agents 932 are configured to perform service handling for services. A given user pattern hiding proxy agent 932 may receive and handle a service portion of a service where the service has been partitioned by user pattern hiding proxy agent selection element 920 or one or more other user pattern hiding proxy agents 932. A given user pattern hiding proxy agent 932 may receive and partition a service, where the service may be received from user pattern hiding proxy agent selection element 920 or another one of the user pattern hiding proxy agents 932 (and may process one or more of the service portions or may propagate one or more of the service portions to one or more other user pattern hiding proxy agents 932). A given user pattern hiding proxy agent 932 may be configured to perform various combinations of such functions.

Thus, at least from the foregoing embodiments, it may be seen that (1) the partitioning of the service into service portions, selection of user pattern hiding proxy agents 932, routing of service portions between selected user pattern hiding proxy agents 932, and like functions may be performed by user pattern hiding proxy agent selection element 920 or one or more of the user pattern hiding proxy agents 932, as well as various combinations thereof and (2) the handling of a given service may be distributed across multiple user pattern hiding proxy agents 932 such that no single user pattern hiding proxy agents 932 has full details of the given service. Thus, for a given service, different portions of the service may be handled by different elements. As a result, an unauthorized entity attempting to identify the service that has been used (and, optionally, the full details of the service) will not be able to obtain the full details of the service that has been used unless the unauthorized entity can identify and access each of the multiple elements which are used to handle the service portions of the service (i.e., access by the unauthorized entity to any subset of the elements which handle the service portions will not enable the unauthorized entity to obtain the full details of the service that has been used). This provides a high level of security for the user using the given service.

The level of security provided by use of the user pattern hiding proxy agent hopping capability, as depicted and described with respect to FIG. 9, may be better understood by considering specific example of services for which the user pattern hiding proxy agent hopping capability may be used.

In at least some embodiments, for example, in the case of an Voice over Internet Protocol (VoIP) service, the user pattern hiding proxy agent selection element 920 may partition the VoIP traffic stream into multiple VoIP traffic portions and route the multiple VoIP traffic portions via multiple user pattern hiding proxy agents 932 such that different VoIP traffic portions of the VoIP call traffic traverse different paths between user device 910 and the destination. In this case, access to any of the one of the user pattern hiding proxy agents 932 that is routing VoIP traffic portion does not provide the full set of VoIP content of the VoIP call and, thus, the VoIP call is still secure.

In at least some embodiments, for example, in the case of a network processing service (e.g., where processing is to be performed for the user device 910 using network resources and an associated result is to be provided to the user device 910), the pattern hiding proxy agent selection element 920 may receive a processing request from user device 910, select a first one of the pattern hiding proxy agents 932, and propagate the processing request to the selected first one of the pattern hiding proxy agents 932. The first one of the pattern hiding proxy agents 932 may then perform a portion of the requested processing, select a second one of the pattern hiding proxy agents 932, and propagate the processing request to the selected second one of the pattern hiding proxy agents 932. The passing of the processing request between pattern hiding proxy agents 932 may continue in this manner until the processing request has been fully processed, at which time a processing result may be returned to user device 910 (or alternatively, the pattern hiding proxy agents 932 may return processing response portions to the user device 910 in parallel with propagation of the processing request between pattern hiding proxy agents 932). In this case, access to any of the one of the pattern hiding proxy agents 932 that is performing processing for the processing request does not provide a complete picture of all of the processing performed based on the processing request of user device 910.

These and other types of services which may be securely provided for a user via use of the user pattern hiding proxy agent hopping capability may better understood by way of reference to FIG. 9.

It will be appreciated that, although primarily depicted and described individually, the various security mechanisms depicted and described herein also may be used in various combinations.

It will be appreciated that various combinations of security mechanisms depicted and described herein may be used to secure communications by corporate users, communications by users associated with non-corporate entities, communications by individuals, or the like. The communications may include communications by a user in his or her role with an entity, personal communications of the user which may be made via one or more personal devices of the user or one or more devices supplied by the entity with which the user is associated, or the like. In this manner, protection may be provided for corporate information or intentions, information or intentions of non-corporate entities, personal information or intentions of individuals or groups of individuals, or the like.

Figure 10:
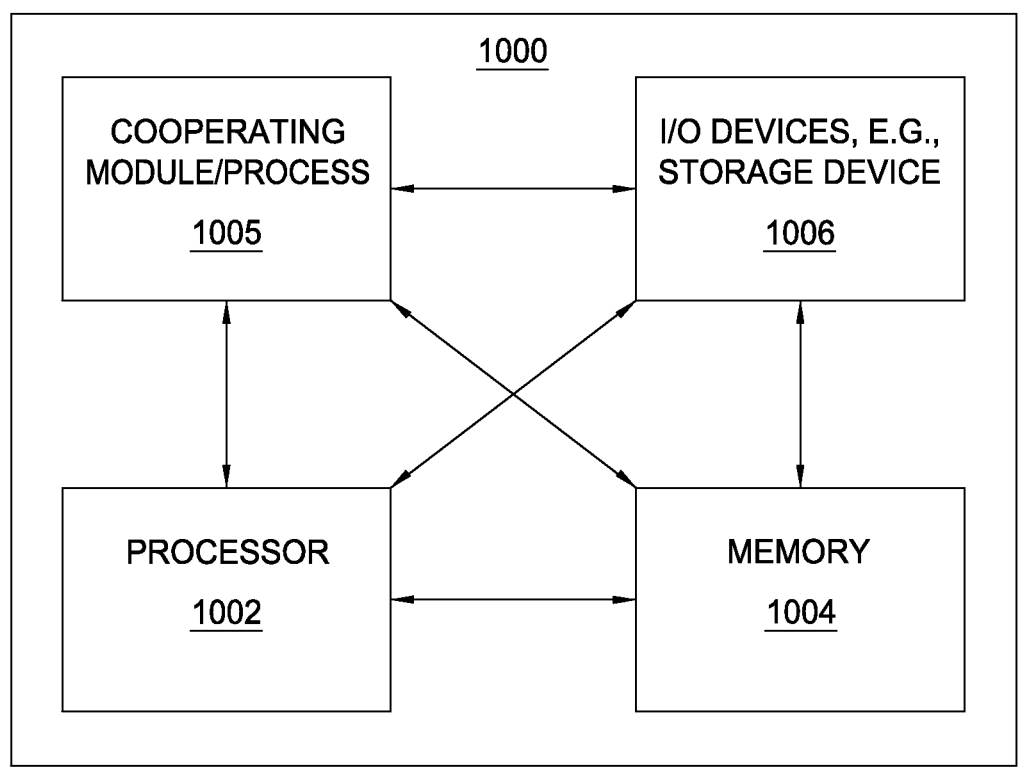
FIG. 10 depicts a high-level block diagram of a computer suitable for use in performing functions described herein.

FIG. 10 depicts a high-level block diagram of a computer suitable for use in performing functions described herein.

As depicted in FIG. 10, computer 1000 includes a processor element 1002 (e.g., a central processing unit (CPU) and/or other suitable processor(s)) and a memory 1004 (e.g., random access memory (RAM), read only memory (ROM), and the like).

The computer 1000 also may include a cooperating module/process 1005. In at least some embodiments, the cooperating process 1005 can be loaded into memory 1004 and executed by the processor 1002 to implement functions as discussed herein. Thus, cooperating process 1005 (including associated data structures) can be stored on a computer readable storage medium, e.g., RAM memory, magnetic or optical drive or diskette, and the like.

The computer 1000 also may include one or more input/output devices 1006 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that computer 1000 depicted in FIG. 10 provides a general architecture and functionality suitable for implementing functional elements described herein and/or portions of functional elements described herein.

It will be appreciated that the functions depicted and described herein may be implemented in hardware or a combination of software and hardware, e.g., using a general purpose computer, via execution of software on a general purpose computer so as to provide a special purpose computer, using one or more application specific integrated circuits (ASICs) or any other hardware equivalents, or the like, as well as various combinations thereof.

It will be appreciated that at least some of the method steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods or techniques described herein are invoked or otherwise provided. Instructions for invoking the inventive methods may be stored in fixed or removable media, transmitted via a data stream in a broadcast or other signal bearing medium, or stored within a memory within a computing device operating according to the instructions.

It will be appreciated that the term "or" as used herein refers to a non-exclusive "or," unless otherwise indicated (e.g., "or else" or "or in the alternative").

It will be appreciated that, while the foregoing is directed to various embodiments of features present herein, other and further embodiments may be devised without departing from the basic scope thereof.

What is claimed is:

1. An apparatus, comprising:
   a processor and a memory communicatively connected to the processor, the processor configured to:
   maintain a plurality of available virtual user spaces associated with a user, each of the available virtual user spaces comprising a respective virtual user identity associated with the user and a respective virtual user device associated with a user device of the user, wherein the respective virtual user identity comprises virtual user information for the user that is at least partially different than real user information associated with the user, wherein the respective virtual user device comprises virtual user device information for the user device that is at least partially different than real user device information associated with the user device;

receive an indication of a communication action associated with the user device of the user, wherein the indication of the communication action includes information associated with the communication action, wherein the information associated with the communication action comprises a real user identity of the user, device information of the user device, and a communication action type of the communication action;

select, from the plurality of available virtual user spaces associated with the user and based on the information associated with the communication action, a selected virtual user space for the communication action, wherein the selected virtual user space is selected based on the real user identity of the user, the device information of the user device, and the communication action type of the communication action; and process the communication action based on the selected virtual user space.

2. The apparatus of claim 1, wherein, for at least one of the virtual user identities, the virtual user information comprises at least one of a virtual name for the user to be used in place of a real name of the user or a virtual address for the user to be used in place of a real address of the user.

3. The apparatus of claim 1, wherein, for at least one of the virtual user devices, the virtual user device information comprises at least one of a virtual device identifier to be used in place of a real device identifier of the user device, virtual user device type information to be used in place of real user device type information of the user device, or virtual device model information to be used in place of real user device model information of the user device.

4. The apparatus of claim 1, wherein, to process the communication action, the processor is configured to:
propagate communication information toward at least one destination device specified in the communication action.

5. The apparatus of claim 4, wherein the communication information comprises at least one of a request for service, a request to establish a voice connection, a request to establish a data connection, an e-mail message, a text message, an instant message, or a request to use a network-based service.

6. The apparatus of claim 1, wherein, to process the communication action, the processor is configured to:
replace real information of the real user identity of the user with at least a portion of the virtual user information of the respective virtual user identity of the selected virtual user space; and
replace at least a portion of the user device information of the user device with at least a portion of the virtual user device information of the respective virtual user device of the selected virtual user space.

7. The apparatus of claim 1, wherein the processor is configured to:
receive, from a device, a communication response intended for the user device of the user;
generate a communication action response, for the communication response received from the device, based on at least one of the respective virtual user identity of the selected virtual user space or the respective virtual user device of the selected virtual user space; and
propagate the communication action response toward the user device.

8. The apparatus of claim 7, wherein, to generate the communication action response, the processor is configured to:
replace at least a portion of the information in the communication response received from the device with at least one of real user information associated with the respective virtual user identity of the selected virtual user space or real user device information associated with the respective virtual user device of the selected virtual user space.

9. The apparatus of claim 1, wherein the selected virtual user space is hosted within a service provider network.

10. The apparatus of claim 1, wherein the processor is configured to select the selected virtual user space by selecting the selected virtual user space to have a virtual device type of the respective virtual user device that is different than a real device type of the user device.

11. An apparatus, comprising:
a processor and a memory communicatively connected to the processor, the processor configured to:
maintain information of a plurality of available virtual user spaces associated with a user, each of the available virtual user spaces comprising a respective virtual user identity associated with the user and a respective virtual user device associated with a user device of the user, wherein the respective virtual user identity comprises virtual user information for the user that is at least partially different than real user information associated with the user, wherein the respective virtual user device comprises virtual user device information for the user device that is at least partially different than real user device information associated with the user device;
detect a communication action initiated for the user of the user device, wherein the communication action includes information associated with the communication action, wherein the information associated with the communication action comprises a real user identity of the user, device information of the user device, and a communication action type of the communication action;
select, from the plurality of available virtual user spaces associated with the user and based on the information associated with the communication action, a selected virtual user space for the communication action, wherein the selected virtual user space is selected based on the real user identity of the user, the device information of the user device, and the communication action type of the communication action; and
propagate an indication of the communication action toward a virtual user server hosting the selected virtual user space.

12. The apparatus of claim 11, wherein the communication action type comprises one of initiation of a voice call, sending of an email, sending of a text message, sending of an instant message, sending of a web browsing request, sending of a web-based transaction, or sending of a request for use of a web-based service.

13. The apparatus of claim 11, wherein the processor is configured to:
receive, from the virtual user server hosting the selected virtual user space, a communication action response associated with the communication action initiated for the user of the user device.

14. The apparatus of claim 13, wherein the communication action response comprises at least one of real user information associated with the respective virtual user identity of the selected virtual user space or real user device information associated with the respective virtual user device of the selected virtual user space.

15. The apparatus of claim 11, wherein the communication action is associated with a destination node, wherein the processor is configured to:
receive, from the destination node, a message associated with the communication action initiated for the user of the user device.

16. The apparatus of claim 11, wherein the selected virtual user space is hosted within a first service provider network of a first service provider, wherein the available virtual user spaces associated with the user include a second virtual user space hosted within a second service provider network of a second service provider.

17. The apparatus of claim 11, wherein the processor is configured to:
detect a second communication action initiated for the user of the user device;
select, from the plurality of available virtual user spaces associated with the user and based on information included within the second communication action, a second selected virtual user space for the second communication action, wherein the second selected virtual user space is different than the selected virtual user space; and
propagate an indication of the second communication action toward a second virtual user server hosting the second selected virtual user space.

18. The apparatus of claim 17, wherein the selected virtual user space is hosted within a first service provider network of a first service provider, wherein the second selected virtual user space is hosted within a second service provider network of a second service provider.

19. The apparatus of claim 17, wherein the respective virtual user identity of the selected virtual user space and the respective virtual user identity of the second selected virtual user space are the same, wherein the respective virtual user device of the selected virtual user space and the respective virtual user device of the second selected virtual user space are different.

20. The apparatus of claim 17, wherein the respective virtual user identity of the selected virtual user space and the respective virtual user identity of the second selected virtual user space are different, wherein the respective virtual user device of the selected virtual user space and the respective virtual user device of the second selected virtual user space are the same.

21. The apparatus of claim 17, wherein the respective virtual user identity of the selected virtual user space and the respective virtual user identity of the second selected virtual user space are different, wherein the respective virtual user device of the selected virtual user space and the respective virtual user device of the second selected virtual user space are different.

22. The apparatus of claim 11, wherein the processor is configured to select the selected virtual user space by selecting the selected virtual user space to have a virtual device type of the respective virtual user device that is different than a real device type of the user device.

* * * * *